United States Patent
Park et al.

(10) Patent No.: US 11,014,138 B2
(45) Date of Patent: May 25, 2021

(54) INDUCTION HEATING METHOD FOR HOT STAMPING PROCESS

(71) Applicant: MS AUTOTECH CO., LTD., Gyeongju-si (KR)

(72) Inventors: Sung Yong Park, Suwon-si (KR); Jae Sung Kim, Yongin-si (KR); Won Ik Eom, Uiwang-si (KR)

(73) Assignees: MS AUTOTECH CO., LTD., Gyeongju-si (KR); MYUNGSHIN INDUSTRY CO., LTD., Gyeongju-si (KR)

( * ) Notice: Subject to any disclaimer, the term of this patent is extended or adjusted under 35 U.S.C. 154(b) by 286 days.

(21) Appl. No.: 16/068,382

(22) PCT Filed: May 8, 2017

(86) PCT No.: PCT/KR2017/004758
§ 371 (c)(1),
(2) Date: Jul. 6, 2018

(87) PCT Pub. No.: WO2017/196039
PCT Pub. Date: Nov. 16, 2017

(65) Prior Publication Data
US 2019/0022727 A1  Jan. 24, 2019

(30) Foreign Application Priority Data

May 9, 2016 (KR) .......................... 10-2016-0056435
Sep. 30, 2016 (KR) .......................... 10-2016-0126380

(51) Int. Cl.
*B21D 22/02* (2006.01)
*B21D 37/16* (2006.01)
(Continued)

(52) U.S. Cl.
CPC ........... *B21D 22/022* (2013.01); *B21D 37/16* (2013.01); *H05B 6/06* (2013.01); *H05B 6/10* (2013.01); *H05B 6/101* (2013.01); *B21D 37/10* (2013.01)

(58) Field of Classification Search
CPC .. C23C 2/12; C23C 2/285; H05B 6/00; H05B 6/02; H05B 6/06; H05B 6/10;
(Continued)

(56) References Cited

U.S. PATENT DOCUMENTS 5,808,281 A * 9/1998 Matsen ................ B21D 26/021
219/634
5,922,234 A * 7/1999 Grow .................... H05B 6/104
219/614
(Continued)

FOREIGN PATENT DOCUMENTS

JP        2003027203 A *  1/2003

OTHER PUBLICATIONS

"Yukio Ueda et al, Welding Deformation and Residual Stress Prevention, 2012, Elsevier, p. 64 Table 3.1" (Year: 2012).*
(Continued)

*Primary Examiner* — Jenny R Wu
(74) *Attorney, Agent, or Firm* — STIP Law Group, LLC

(57) ABSTRACT

A high-frequency heating method for a hot stamping process includes: a first heating step of high-frequency heating a steel sheet, which has an aluminum (Al) coating layer formed on an iron (Fe)-based base material, to a first target temperature at a first heating rate; a second heating step of melting the coating layer by high-frequency heating the steel sheet, which has passed through the first heating step, to a second target temperature at a second heating rate, wherein the second heating rate is lower than the first heating rate; and a third heating step of high-frequency heating the steel
(Continued)

sheet, which has passed through the second heating step, to a third target temperature at a third heating rate, wherein the third heating rate is lower than the second heating rate. A compound is formed by a reaction between a material of the coating layer and a material of the base material in the second heating step. Therefore, the coating layer is not shifted even when high-frequency heating is performed at a temperature equal to or higher than the melting point of the coating layer.

2 Claims, 5 Drawing Sheets

(51) Int. Cl.
    *H05B 6/06*     (2006.01)
    *H05B 6/10*     (2006.01)
    *B21D 37/10*     (2006.01)

(58) Field of Classification Search
    CPC .......... H05B 6/101; H05B 6/36; H05B 6/362; H05B 6/365; C21D 1/02; C21D 1/04; C21D 1/42; C21D 1/68; C21D 1/70; C21D 1/72; C21D 9/46; C21D 9/60
    See application file for complete search history.

(56) References Cited

U.S. PATENT DOCUMENTS

| | | | |
|---|---|---|---|
| 6,455,825 B1* | 9/2002 | Bentley | G05D 23/26 |
| | | | 148/567 |
| 2010/0072192 A1* | 3/2010 | Hirota | H05B 6/365 |
| | | | 219/647 |

OTHER PUBLICATIONS

"J. Dossett and G.E. Totten, Induction Heat Treating Systems, 2014, ASM Handbook, vol. 4B, 208-219" (Year: 2014).*

International Search Report of PCT/KR2017/004758, dated Jul. 27, 2017, English Translation.

* cited by examiner

[FIG. 1]
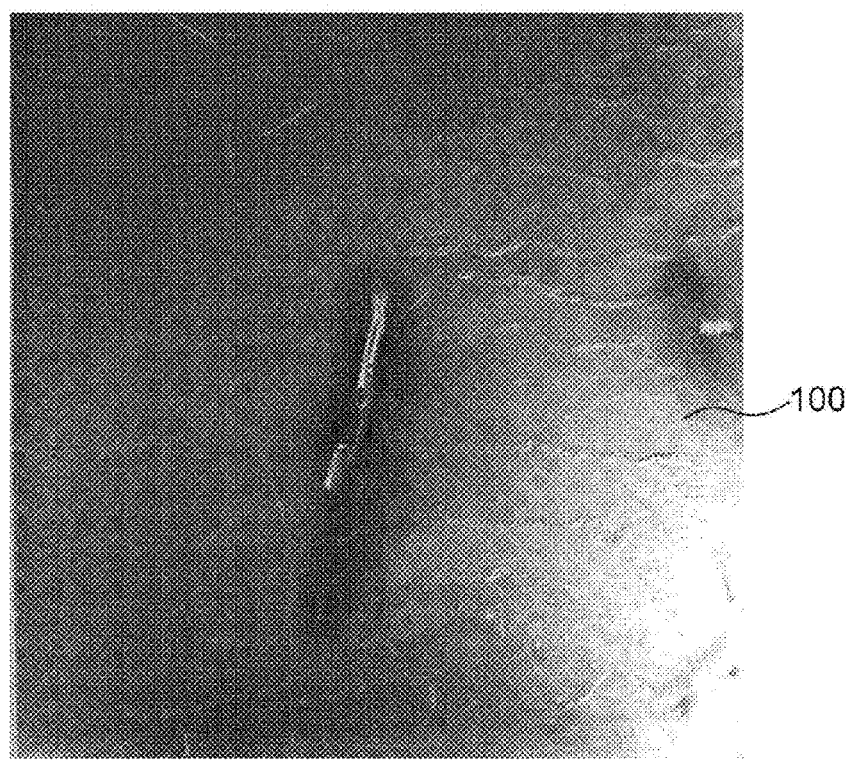
[FIG. 2]
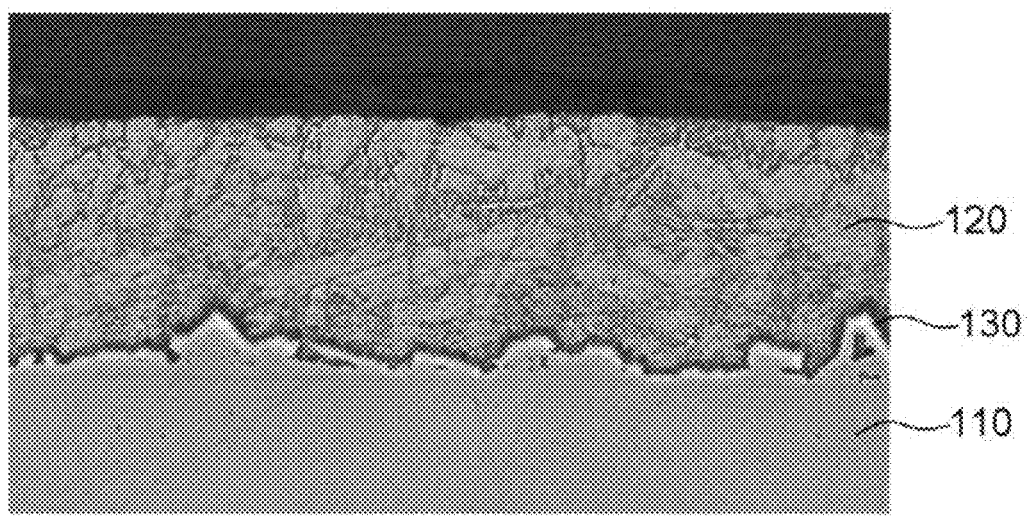

[FIG. 3]
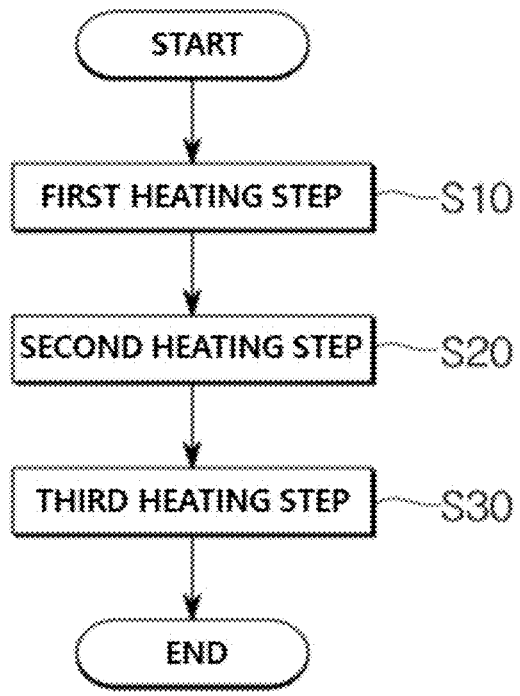
[FIG. 4]
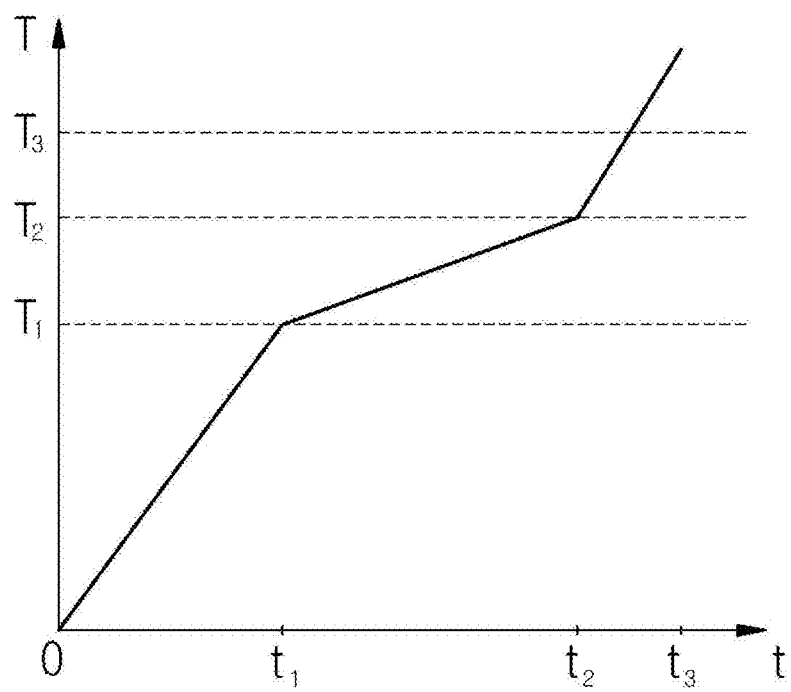

[FIG. 5A]
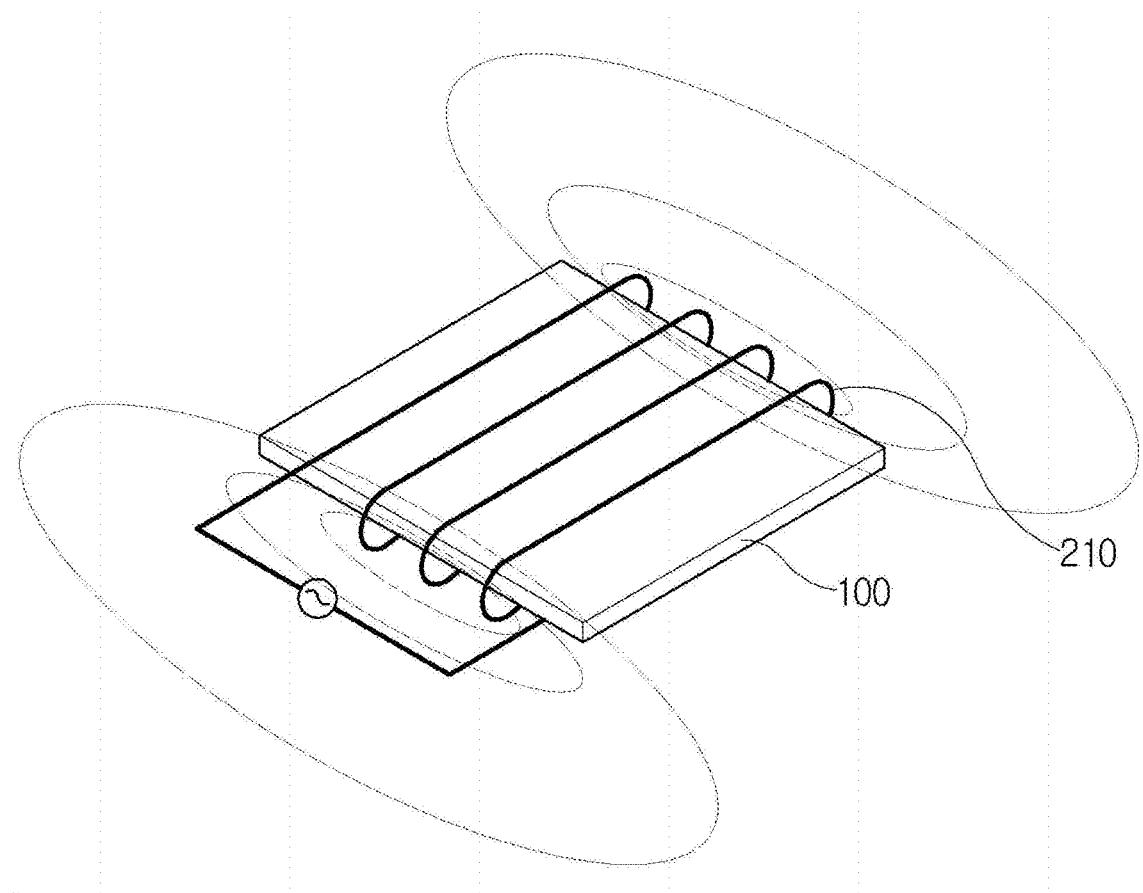

[FIG. 5B]
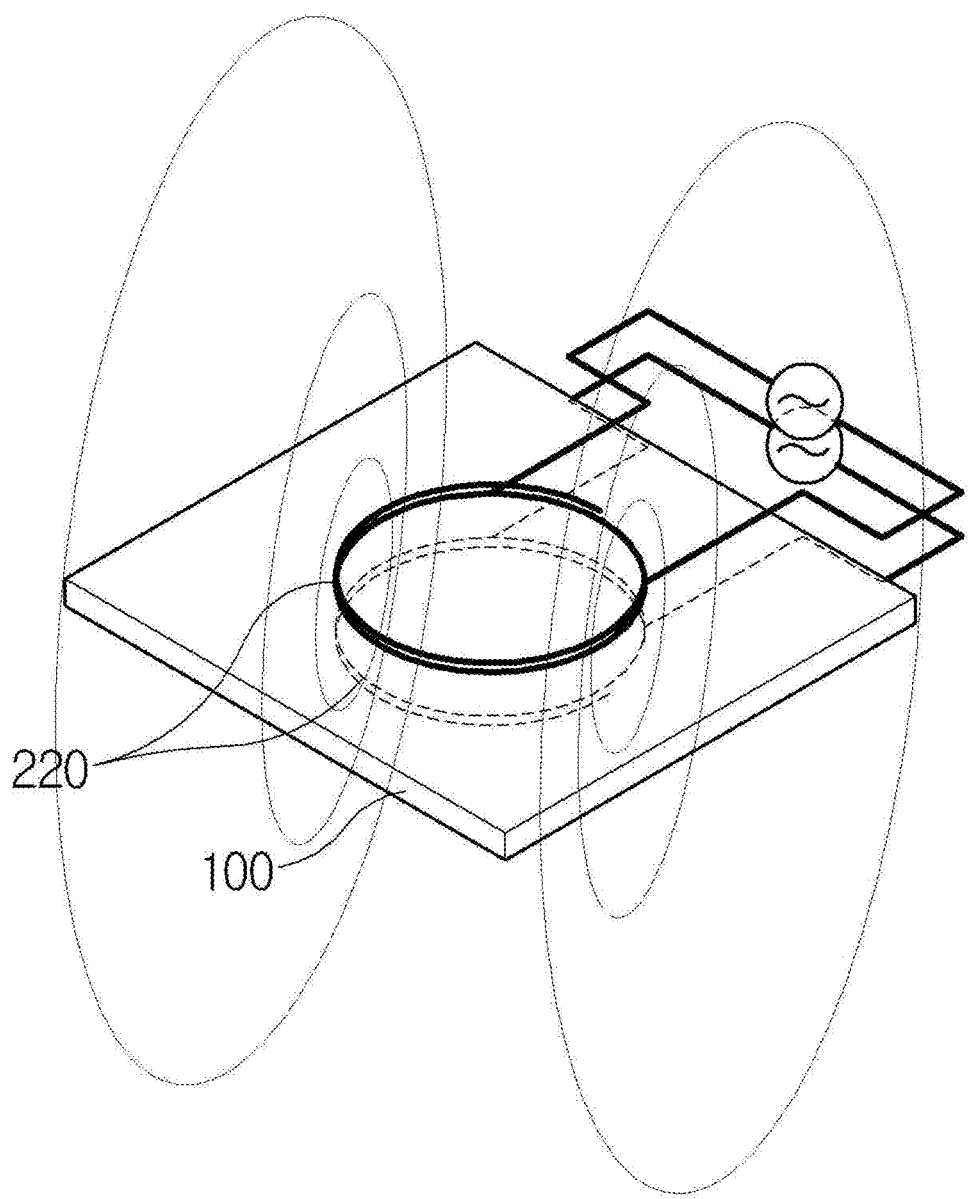

[FIG. 6A]
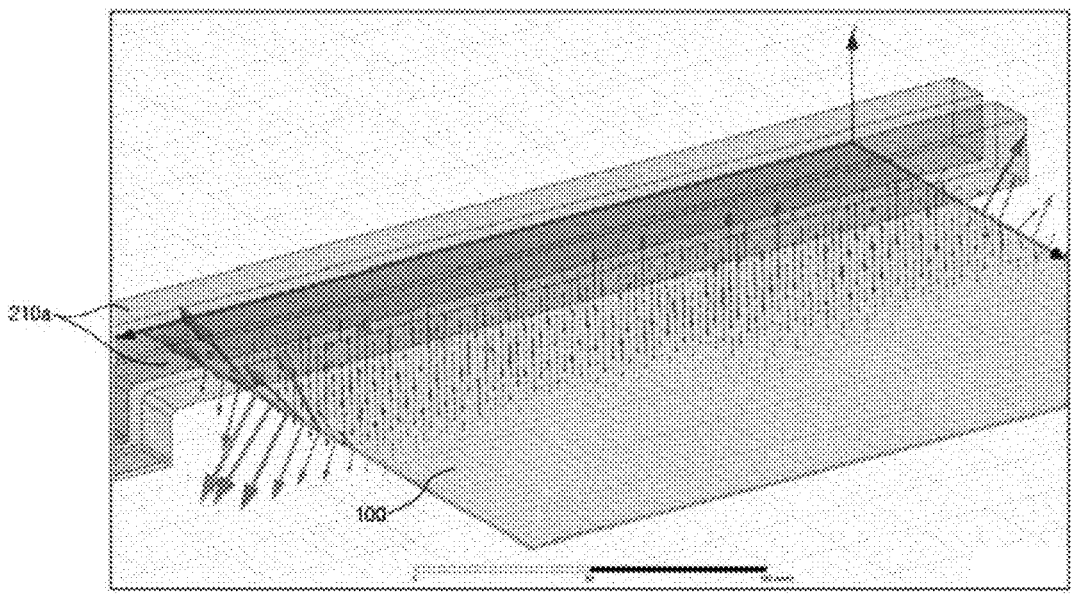
[FIG. 6B]
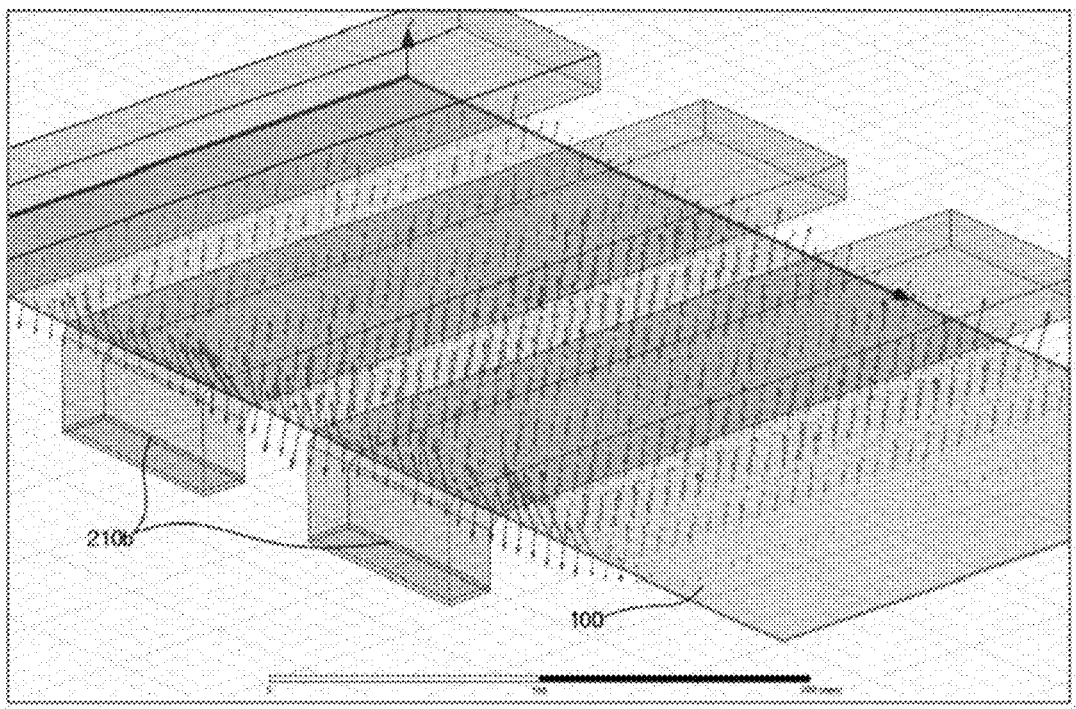

INDUCTION HEATING METHOD FOR HOT STAMPING PROCESS

CROSS-REFERENCE TO RELATED APPLICATIONS

This application is the U.S. National Phase under 35 U.S.C. § 371 of International Application No. PCT/KR2017/004758 filed on May 8, 2017, which in turn claims the benefit of Korean Application No. 10-2016-0056435 filed on May 9, 2016, and Korean Application No. 10-2016-0126380 filed on Sep. 30, 2016, the disclosures of which are incorporated by reference into the present application.

TECHNICAL FIELD

The present invention relates to a high-frequency heating method for a hot stamping process, and more particularly, to a high-frequency heating method for a hot stamping process, which heats a steel sheet and forms the steel sheet into an ultra high strength steel.

BACKGROUND ART

Generally, a hot stamping technique is a forming technique to produce a high strength component by heating a steel sheet to an appropriate temperature (about 900° C.) and press forming in a die.

In a conventional hot stamping process, a material is heated by using an electric furnace. However, a heating system using an electric furnace has to be equipped with a long facility line for heating, and energy consumption is large for raising the temperature of the electric furnace itself. Even when the heating system is not operated, energy has to be continuously used to maintain the temperature of the electric furnace. Thus, energy efficiency of the electric furnace is low.

In order to solve this problem, a heating method using a high frequency heater has been introduced. In this case, the high-frequency heater requires only a short facility line and can heat a steel sheet in a short time. The high-frequency heater is excellent in energy efficiency.

Referring to FIG. 1, according to a conventional high-frequency heating method, since an electromagnetic force (Lorentz force) is generated when using a high-frequency induction heating coil, ionization occurs in a coating layer on a steel sheet after a temperature at which the coating layer is melted and polarized ions are swept by the Lorentz force. Consequently, the coating layer agglomerates and flows on the steel sheet. Therefore, after the temperature at which the coating layer is melted, the high-frequency heater cannot be used and the heating has to be performed using the electric furnace.

DISCLOSURE

Technical Problem

The present invention has been made in an effort to solve problems of the conventional high-frequency heating method for a hot stamping process, and provides a high-frequency heating method for a hot stamping process, which is capable of performing high-frequency heating at a melting point or more of a coating layer.

Technical Solution

According to an embodiment, a high-frequency heating method for a hot stamping process includes: a first heating step of high-frequency heating a steel sheet, which has an aluminum (Al) coating layer formed on an iron (Fe)-based base material, to a first target temperature at a first heating rate; a second heating step of melting the coating layer by high-frequency heating the steel sheet to a second target temperature at a second heating rate, wherein the second heating rate is lower than the first heating rate; and a third heating step of high-frequency heating the steel sheet to a third target temperature at a third heating rate, wherein the third heating rate is higher than the second heating rate, wherein a compound is formed by a reaction between the coating layer and the base material in the second heating step.

In the second heating step, an applied current may be adjusted so that an electromagnetic force (F) generated during the high-frequency heating is less than a bonding force between particles of the coating layer or a bonding force (f) between the coating layer and the base material ($F<f$).

The first target temperature may be 530° C. to 570° C., which is a temperature equal to or lower than a melting point of the coating layer.

The second target temperature may be 730° C. to 770° C., which is a temperature at which the steel sheet loses properties of a ferromagnetic material.

The second heating rate may be 6.4° C./s to 24° C./s.

In the first heating step and the second heating step, the high-frequency heating may be performed by longitudinal flux induction heating (LFIH), and in the third heating step, the high-frequency heating may be performed by transverse flux induction heating (TFIH).

In the second heating step, a wider coil may be used in the second heating step than a coil used in the first heating step, and an interval between the coils in the second heating step may be wider than an interval between the coils in the first heating step.

In the second heating step, the coil used in the second heating step may have a width of 70 mm to 90 mm.

In the second heating step, the interval between the coils in the second heating step is 50 mm to 70 mm.

Advantageous Effects

In the high-frequency heating method for the hot stamping process according to the present invention, the compound layer is formed between the coating layer and the base material and the high-frequency heating is performed without the coating layer being swept even when the high-frequency heating is performed at the temperature equal to or higher than the melting point of the coating layer.

BRIEF DESCRIPTION OF THE DRAWINGS

Embodiments of the present invention will be more clearly understood from the following detailed description taken in conjunction with the accompanying drawings in which:

FIG. 1 is a photograph showing a shift of a coating layer by conventional high-frequency heating;

FIG. 2 is a cross-sectional photograph of a steel sheet by a hot stamping process;

FIG. 3 is a flowchart of a high-frequency heating method for a hot stamping process according to an embodiment of the present invention;

FIG. 4 is a time-temperature graph of the high-frequency heating method for the hot stamping process according to an embodiment of the present invention;

FIG. 5A is a conceptual view of a high-frequency heating method employing longitudinal flux induction heating (LFIH), which is used in the present invention;

FIG. 5B is a conceptual view of a high-frequency heating method employing transverse flux induction heating (TFIH), which is used in the present invention;

FIG. 6A is a conceptual view showing a magnitude of an electromagnetic force applied to a steel sheet during heating in a conventional heating method and a first heating step (S10); and FIG. 6B is a conceptual diagram illustrating a magnitude of an electromagnetic force applied to a steel sheet during heating in a second heating step (S20) of the present invention.

MODE FOR INVENTION

Preferred embodiments of the present invention will be described in detail with reference to the accompanying drawings.

Referring to FIG. 3, a high-frequency heating method for a hot stamping process according to an embodiment of the present invention includes a first heating step S10, a second heating step S20, and a third heating step S30.

In the first heating step S10 and the second heating step S20, heating is performed by a high-frequency heating method employing longitudinal flux induction heating (LFIH). FIG. 5A is a conceptual view of the high-frequency heating method employing LFIH. In the high-frequency heating, when a steel sheet 100 passes through a coil 210 along which a current of a high frequency (1 KHz or more) flows, an eddy current $I_1$ inducing a magnetic field in the steel sheet 100 is generated. The magnetic field by the eddy current $I_1$ is generated in a direction of cancelling a magnetic field generated from the coil 210 by an electromagnetic induction phenomenon. Due to the eddy current, the electric energy of the power (energy consumption per unit time) $P1=I_1^2R$ is converted into heat in the relationship with the resistance R of the steel plate 100 itself, and the temperature of the steel plate 100 increases.

In the first heating step S10, the steel sheet 100 is high-frequency heated to a first target temperature $T_1$ at a first heating rate $V_1$. At this time, the steel sheet 100 according to the present invention includes an aluminum (Al) coating layer 120 formed on an iron (Fe)-based base material 110 (see FIG. 2). Iron has high tensile strength and can be made into ultra high strength steel of 150 kg/mm² or more when processed by hot stamping. In addition, the coating layer 120 according to the present invention is made of aluminum-silicon (Al—Si)-based aluminium alloys.

In the first heating step S10, the steel sheet is heated to a temperature equal to or lower than the melting point of the coating layer 120, which is the first target temperature $T_1$, for 5 seconds to 10 seconds. In the present invention, the temperature equal to or lower than the melting point of the coating layer 120, which is the first target temperature $T_1$, is preferably 530° C. to 570° C. When the temperature is lower than 530° C., the time required for the heating in the second heating step S20 becomes longer, and the facility line required for the heating becomes longer. Therefore, this is inefficient. In addition, when the temperature exceeds 570° C., the coating layer 120 may be pre-melted.

As a result, when it is assumed that the heating starts at room temperature (20° C.), the heating is performed to 530° C. to 570° C. for 5 seconds to 10 seconds, and thus, the first heating rate $V_1$ is 51° C./s to 110° C./s.

In the second heating step S20, the steel sheet 100 having passed through the first heating step S10 is high-frequency heated to a second target temperature at a second heating rate to melt the coating layer 120. Thus, a compound 130 is formed by a reaction between the coating layer 120 and the base material 110. As illustrated in FIG. 2, the compound 130 may be formed on the surface of the base material 110. Although not illustrated, the compound 130 may be formed inside the coating layer 120. The compound 130 may prevent the coating layer 120 from agglomerating or flowing in the third heating step S30.

Since the coating layer 120 is made of an aluminum-silicon (Al—Si)-based aluminum alloy and the steel sheet 100 is made of iron (Fe), the compound 130 may be at least one of $Al_8Fe_2Si$, $Al_2Fe_2Si$, and $Fe_2Al5/FeAl_2$ compounds. The $Al_8Fe_2Si$ compound has a melting temperature of about 855° C., the $Al_2Fe_2Si$ compound has a melting temperature of about 1,050° C., and the $Fe_2Al_5/FeAl_2$ compound has a melting temperature of about 1,156° C. Thus, due to the compound formed in the coating layer 120, the melting temperature of the coating layer 120 may be increased to prevent the coating layer 120 from agglomerating or flowing in the third heating step S30.

In the second heating step S20, the steel sheet 100 having passed through the first heating step S10 is high-frequency heated to the second target temperature $T_2$ at a second heating rate $V_2$. At this time, in the present invention, a current applied to the coil 210 is lower than in the first heating step S10, and thus an eddy current $I_2$ generated in the steel sheet 100 is reduced. Therefore, the power $P_2=I_2^2R$ converted into heat energy in the steel sheet 100 is reduced, and the second heating rate $V_2$ becomes smaller than the first heating rate $V_1$.

In the present invention, the applied current is adjusted so that an electromagnetic force F generated during the high-frequency heating is less than a bonding force f between the coating layer 120 and the base material 110 (F<f).

In the case of high-frequency heating a metal, the metal can be heated by an electromagnetic induction phenomenon. Meanwhile, a magnetic field B is generated by a current applied to the coil 210, and an electromagnetic force (Lorentz force: F=qv×B) is applied to a charge q of the metal moving at a speed v. In a case where the metal is in a solid state, even if the electromagnetic force F is applied, there is no influence due to a strong bonding force between particles. However, after the metal is melted, the charge q of the liquid metal is moved by the electromagnetic force F. Therefore, when the coating layer 120 is high-frequency heated at a temperature higher than the melting point of the coating layer 120, the coating layer 120 may be segregated from the base material 110, and agglomerate and flow on the base material 110 by the electromagnetic force F. In this case, the thickness of the coating layer 120 can not be constant and the surface of the steel sheet 100 can be uneven (see FIG. 1).

Therefore, in the present invention, the electromagnetic force F is lowered in the second heating step S20 and the applied current is adjusted so as to be smaller than the inter-particle bonding force of the coating layer 120 or the bonding force f between the coating layer 120 and the base material 110. As a result, the eddy current I2 generated in the steel sheet 100 is reduced, and the second heating rate $V_2$ is lower than the first heating rate $V_1$.

In the second heating step S20, the steel sheet 100 is heated to the second target temperature $T_2$, that is, a temperature (Curie temperature) at which the ferromagnetic property of the steel sheet 100 is lost, for 10 seconds to 25 seconds. When the steel sheet 100 is heated to the second target temperature $T_2$ for less than 10 seconds, there is a possibility of causing the coating layer 120 to be segregated, agglomerated and flow on the base material 110 by the electromagnetic force F. When the steel sheet 10 is heated to the second target temperature $T_2$ for more than 25 seconds, a facility line necessary for the heating becomes longer, which results in a deterioration in efficiency.

In the present invention, the second target temperature $T_2$, that is, the temperature (Curie temperature) at which the steel sheet 100 loses the ferromagnetic property is preferably 730° C. to 770° C. When the temperature is lower than 730° C., the time required for the heating in the third heating step S30 becomes longer, and the facility line required for the heating becomes longer. Therefore, this is inefficient. In addition, when the temperature exceeds 770° C., the steel plate 100 loses the properties of the ferromagnetic material, and the heating efficiency is drastically reduced under the high-frequency heating method employing the LFIH.

Therefore, since it is heated from the first target temperature $T_1$ to the second target temperature $T_2$ for 10 seconds to 25 seconds, the second heating rate $V_2$ is 6.4° C./s to 24° C./s.

Referring to FIGS. 6A and 6B, in the second heating step S20 of the present invention, coils 210b, which are wider than coils 210a used in the first heating step S10, are used for heating. A winding interval, that is, an interval between the coils 210b, is greater than a winding interval between the coils 210a in the first heating step S10. In the present embodiment, preferably, the coil 210b used in the second heating step S20 has a width of 70 mm to 90 mm and are arranged at an interval of 50 mm to 70 mm.

When the width of the coil is less than 70 mm or the interval between the coils is less than 50 mm, the coating layer 120 may agglomerate or flow. The width of the coil exceeding 90 mm or the interval between the coils exceeding 70 mm, requires a longer facility line and leads to inefficient result.

In the first heating step S10 and the conventional heating method, coils having a width of 10 mm to 20 mm were used, and the interval between the coils was less than 50 mm. Meanwhile, in the second heat step S20 of the present invention, the coils 210b are wider in width than the coils 210a used in the first heating step S10. The interval between the coils 210b arranged in the second heating step is wider than the interval between the coils 210a arranged in the first heating step. According the present invention, the coating layer 120 can be formed uniformly.

In FIG. 6A, the magnitude of the electromagnetic force F applied to the steel sheet 100 by the coils 210a using the conventional coil and winding interval is expressed as arrows. When the steel sheet 100 is heated by using the conventional coil and winding interval, the magnitude of the electromagnetic force F per unit area applied to the steel sheet 100 is measured to be $1.29 \times 10^7$ to $9.09 \times 10^7$ (N/m²). This means that the electromagnetic force F applied to the steel sheet 100 can be vary 7 times. This phenomenon occurs when a current-power density applied per unit area to increase in the case where the width of the coil 210a is narrow and the interval between the coils 210a is narrow. When the electromagnetic force F is not uniform and is instantaneously concentrated in a portion, the coating layer 120 may agglomerate or flow.

Meanwhile, as illustrated in FIG. 6B, in the case of applying the present embodiment, the magnitude of the electromagnetic force F per unit area applied to the steel sheet 100 is $1.29 \times 10^7$ to $2.59 \times 10^7$ (N/m²). This means that the deviation of the electromagnetic force F per unit area is reduced by twice or less by widening the width and the interval of the coils 210b. Therefore, according to the embodiment, a relatively uniform electromagnetic force F is applied to the steel sheet 100 and the phenomenon of agglomerating or flowing of the coating layer 120 can be prevented. For reference, the electromagnetic force F measured at the side end in a transferring direction of the steel sheet 100 illustrated in FIG. 6B is applied to the entire steel sheet 100 and is not related to the agglomerating and flowing of the coating layer 120.

In the third heating step S30, the steel sheet 100 having passed through the second heating step S20 is high-frequency heated to a third target temperature $T_3$ at a third heating rate $V_3$. In the third heating step S30, high-frequency heating is performed by transverse flux induction heating (TFIH).

FIG. 5B is a conceptual diagram of a high-frequency heating method employing TFIH. The TFIH will be described below with reference to FIG. 5B. Two vertical coils 220 perpendicular to the conveying path of the steel sheet 100 are arranged vertically to the conveying path, and the steel sheet 100 passes through the two vertical coils 220. The vertical coil 220 is a circular coil that is opened toward the steel sheet 100. When a current is applied, a magnetic field is generated in the vertical coils 220. An eddy current $I_3$ caused by electromagnetic induction is generated in the steel sheet 100 passing through the magnetic field. Energy corresponding to the power $P_3 = I_3^2 R$ is converted into heat, and the temperature of the steel sheet 100 is increased.

In the present invention, in the first heating step S10 and the second heating step S20 the heating is performed by LFIH, and in the third heating step S30 the heating is performed by TFIH. When heating a ferromagnetic material such as iron (Fe) by the LFTH, the magnetic field generated in the coil 210 is well absorbed and the heating is easily performed. When heating a non-magnetic material by the LFTH, the magnetic field generated in the coil 210 is not absorbed and the heating efficiency is reduced. Meanwhile, in the case of the TFIH, the number of magnetic fields (magnetic flux) which is generated in the vertical coil 220 and meets a non-magnetic material increases, thereby the heating efficiency increases.

Therefore, in the present invention, in the first heating step S10 and the second heating step S20 before reaching the Curie temperature, high-frequency heating is performed by the LFIH, and after reaching the Curie temperature, they high-frequency heating is performed by the TFIH, thereby maximizing the heating efficiency.

In the third heating step S30, the steel sheet 100 is heated to a third target temperature $T_3$ of 900° C. or more for 2 seconds to 5 seconds. Therefore, since it is heated from the second target temperature $T_2$ to the third target temperature $T_3$ for 2 seconds to 5 seconds, the third heating rate $V_3$ is 26° C./s to 110° C./s.

Meanwhile, the third heating step S30 of the present invention is not limited to the third target temperature $T_3$, and may raise the temperature to a temperature higher than the third target temperature $T_3$ if necessary. It is also possible to further add a process of machining the steel sheet 100 after the third heating step S30.

The graph of FIG. 4 is a time-temperature graph showing a temperature rise pattern of the steel sheet 100 over time. At this time, the first heating rate $V_1$ is a slope of a section from 0 to t1 of the graph, the second heating rate $V_2$ is a slope of a section between t1 and t2 of the graph, and the third heating rate V3 is a slope of a section from t2 to t3 of the graph. Referring to FIG. 2, the high-frequency heating method for the hot stamping process according to the present invention can heat the steel sheet 100 at a rate of 110° C./s by introducing the high-energy high-frequency heating method, can prevent the coating layer 120 from being shifted during high-frequency heating, and can overcome a problem that the heating efficiency is reduced in the section of 750° C. or more.

In addition, in the second heating step S20, the heating is performed by using the coil 210*b* that has a wider width and a larger interval between coils than the coil 210*a* used in the first heating step S10. Therefore, the deviation of the electromagnetic force F applied to the steel sheet 100 is reduced, thereby preventing the coating layer 120 from agglomerating and flowing down.

While specific embodiments of the present invention have been illustrated and described, it will be understood by those skilled in the art that changes may be made to those embodiments without departing from the spirit and scope of the invention that is defined by the following claims.

What is claimed is:

1. An induction heating method for a hot stamping process, comprising:
    a first heating step of induction heating a steel sheet, which has an aluminum (Al) coating layer formed on an iron (Fe)-based base material, to a first target temperature at a first heating rate;
    a second heating step of melting the coating layer by induction heating the steel sheet to a second target temperature at a second heating rate, wherein the second heating rate is lower than the first heating rate; and
    a third heating step of induction heating the steel sheet to a third target temperature at a third heating rate, wherein the third heating rate is higher than the second heating rate,
    wherein,
    a compound is formed by a reaction between the coating layer and the base material in the second heating step,
    in the first heating step, a first heating rate ($V_1$) is 51° C./s to 110° C./s,
    in the second heating step, an applied current is adjusted so that an electromagnetic force (F) generated during the induction heating is less than a bonding force between particles of the coating layer or a bonding force (f) between the coating layer and the base material (F<f),
    the first target temperature is 530° C. to 570° C., which is a temperature equal to or lower than a melting point of the coating layer,
    the second target temperature is 730° C. to 770° C., which is a temperature at which the steel sheet loses properties of a ferromagnetic material,
    the second heating rate is 6.4° C./s to 24° C./s,
    a wider coil is used in the second heating step than a coil used in the first heating step, and an interval between the coils in the second heating step is wider than an interval between the coils in the first heating step,
    the coil used in the second heating step has a width of 70 mm to 90 mm, and
    the interval between the coils in the second heating step is 50 mm to 70 mm.

2. The induction heating method of claim 1, wherein, in the first heating step and the second heating step, the induction heating is performed by longitudinal flux induction heating (LFIH), and in the third heating step, the induction heating is performed by transverse flux induction heating (TFIH).

\* \* \* \* \*